Patented Nov. 19, 1929

1,736,081

UNITED STATES PATENT OFFICE

EDUARD HOLZAPFEL AND OTTO BRAUNSDORF, OF HOCHST-ON-THE-MAIN, GERMANY, ASSIGNORS TO GENERAL ANILINE WORKS, INC., OF NEW YORK, N. Y., A CORPORATION OF DELAWARE

PROCESS OF PRODUCING VAT DYESTUFFS OF THE ISODIBENZANTHRONE SERIES

No Drawing. Application filed December 16, 1926, Serial No. 155,331, and in Germany December 18, 1925.

Our present invention relates to a new process of preparing vat dyestuffs of the benzanthrone series.

In application (Ser. No. 61,775 filed October 10, 1925, in the names of Paul Nawiasky, Eduard Holzapfel and Otto Braunsdorf) vat dyestuffs are described which can be obtained by treating benzanthronyl sulfides or other thioethers of benzanthrone, or derivatives thereof, with alkaline condensing agents.

Now we have found that the oxidation products derived from benzanthronyl-thioethers and having a sulfoxide or sulfone character can be converted sometimes with still greater facility, into valuable vat dyestuffs by means of alkaline condensing agents.

The following examples serve to illustrate our invention, but they are not intended to limit it thereto, all parts being by weight.

1. 50 parts of Bz-1-Bz-1'-benzanthronylsulfide are dissolved in 500 parts of sulfuric acid of 95% strength, and there are gradually added thereto, while cooling with ice, 10 parts of hydrogen peroxide of 30% strength. When the reaction is complete, the melt which is at first bluish-green shows a deep yellowish-brown color. The mass is then poured on ice, filtered by suction and washed until neutral. The oxidation product is a brownish-yellow powder, which dissolves in hot nitrobenzene to a brown solution with a red fluorescence. The color of its solution in concentrated sulfuric acid is yellowish-brown with a yellowish fluorescence.

50 parts of this oxidation product are introduced at 90–100° C. into a melt of 50 parts of caustic potash and 50 parts of ethyl alcohol and the whole is stirred at this temperature until the reaction is complete. The melt is dissolved in water and air is passed through the liquid until there is no dyestuff left in solution in the form of its leuco compound. The mass is then filtered and thoroughly washed with water. The dyestuff thus obtained is isodibenzanthrone, which is practically free from dibenzanthrone. It may, if necessary, be further purified by the known methods for instance by treating it with an organic solvent.

The reaction most probably proceeds according to the following equation:

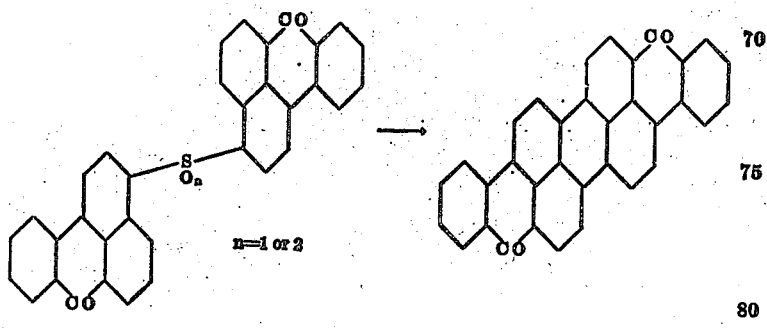

If the oxidation process is carried out with nitric acid in sulfuric acid or nitrobenzene, there are obtained products of the same character as that of the above described product which, however, contain nitrogen. They are probably nitroderivatives and are capable of being reduced to the corresponding amino derivatives. These amino derivatives yield, when condensed with alcohol and caustic potash, violet-blue vat dyestuffs containing nitrogen:

2. 100 parts of Bz-1-Bz-1'-benzanthronylsulfide are introduced at ordinary temperature, while stirring, into 1000 parts of sulfuric acid of 66° Bé.; there is then added a mixture of 50 parts of nitric acid and 150 parts of concentrated sulfuric acid so slowly that there is no considerable rise of temperature. After having further stirred the mass for some hours, it is poured on ice, the brownish-yellow precipitate is drawn off by suction, washed until neutral and dried. The reaction product is a brownish-yellow powder which dissolves in concentrated sulfuric acid to a yellowish-olive solution. On heating this solution its color changes to blue or bluish-violet. Analysis of the product shows that it is most probably a dinitrobenzanthronyl-sulfone, which can be converted into the corresponding diamino derivative by treating it with a diluted solution of sodium sulfide at the temperature of the water bath. This diamino derivative is a reddish-brown powder, which dissolves in concentrated sulfuric acid to an olive-green solution which, when heated, changes to bluish-green.

By melting this product with caustic potash and ethyl alcohol at 130–140° C. a dark-blue vat dyestuff is obtained which gives a blue vat with red fluorescence from which cotton is dyed blue tints with a violet hue. On chlorination, the color changes into a marine-blue. In concentrated sulfuric acid the dyestuff dissolves to a green solution.

It corresponds most probably to the formula:

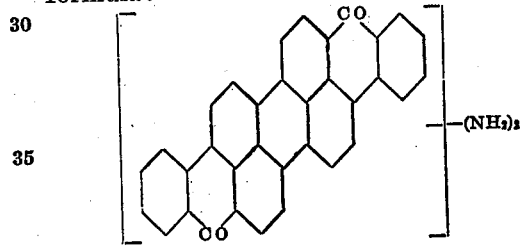

We claim:

1. The process which comprises treating a compound of the general formula:

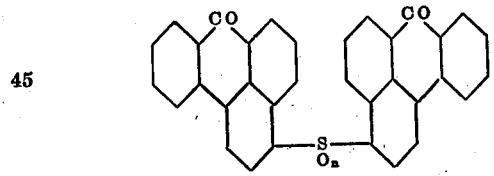

wherein the benzanthrone nuclei may be substituted and $n$ stands for 1 or 2, with an alkaline metal hydroxide.

2. The process which comprises heating a compound of the general formula:

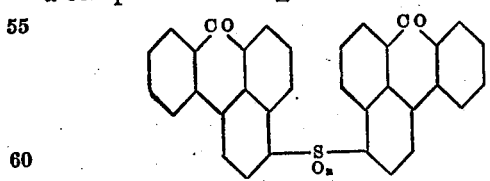

wherein the benzanthrone nuclei may be substitued and $n$ represents 1 or 2, with an alkaline metal hydroxide in the presence of an aliphatic alcohol of low molecular weight.

3. The process which comprises treating a compound of the general formula:

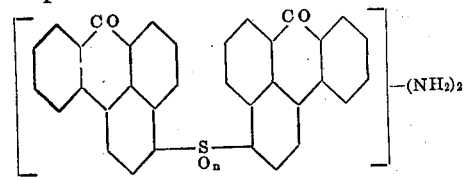

wherein $n$ stands for 1 or 2, with an alkaline metal hydroxide.

4. The process which comprises heating diamino-benzanthronylsulfone of the most probable formula:

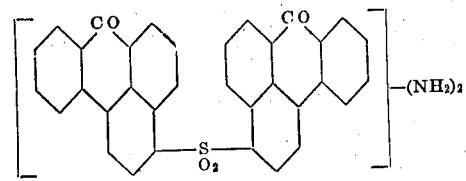

with caustic potash and ethyl alcohol at a temperature of about 130° to 140° C.

In testimony whereof, we affix our signatures.

EDUARD HOLZAPFEL.
OTTO BRAUNSDORF.